United States Patent [19]

Komatsu

[11] Patent Number: 5,519,515
[45] Date of Patent: May 21, 1996

[54] METHOD OF DETERMINING COLOR SIGNALS FOR INPUT SIGNALS AT VERTICES IN INPUT COLOR SPACE

[75] Inventor: Manabu Komatsu, Tokyo, Japan

[73] Assignee: Ricoh Company, Ltd., Tokyo, Japan

[21] Appl. No.: 312,781

[22] Filed: Sep. 26, 1994

[30]    Foreign Application Priority Data

Sep. 27, 1993  [JP]  Japan .................................. 5-239783
Sep. 6, 1994   [JP]  Japan .................................. 6-212729

[51] Int. Cl.$^6$ ............................... H04N 1/56; H04N 1/60
[52] U.S. Cl. ........................ 358/518; 358/523; 358/525
[58] Field of Search ................................ 358/518, 523, 358/525, 519, 520; 382/167

[56]    References Cited

U.S. PATENT DOCUMENTS

| | | | |
|---|---|---|---|
| 4,328,515 | 5/1982 | Wellendorf | 358/523 |
| 4,334,240 | 6/1982 | Franklin | 358/525 |
| 4,477,833 | 10/1984 | Clark et al. | 358/525 |
| 4,926,254 | 5/1990 | Nakatsuka et al. | 358/519 |
| 4,929,978 | 5/1990 | Kanamori et al. | 358/520 |
| 5,233,412 | 8/1993 | Nishihara | 358/518 |
| 5,311,332 | 5/1994 | Imao et al. | 358/518 |
| 5,339,176 | 8/1994 | Smilansky et al. | 358/518 |
| 5,390,035 | 2/1995 | Kasson et al. | 358/518 |
| 5,398,121 | 3/1995 | Kowalewski et al. | 358/523 |
| 5,436,739 | 7/1995 | Imao et al. | 358/518 |

*Primary Examiner*—Scott A. Rogers
*Attorney, Agent, or Firm*—Cooper & Dunham

[57]    ABSTRACT

A color signal determining method comprises steps of: dividing a three-dimensional input color space into a plurality of unit solid figures, each of the solid figures having a set of vertices; determining a plurality of color correction parameters based on input signals at all the vertices; producing a simulator which correlates predetermined color signals with simulated input signals through the color correction parameters; and determining each of first color signals for the input signals at all the vertices by selecting one of the predetermined color signals when a color difference between a color correction parameter relating to one of the input signals at the vertices and a color correction parameter relating to one of the simulated input signals is detected to be smallest among color differences between the above one of the input signals and all the simulated input signals.

10 Claims, 10 Drawing Sheets

(VERTEX COLOR)

| | | | VERTEX COLOR x | | | | |
|---|---|---|---|---|---|---|---|
| SIMULATED COLOR | ... | a | | b | c | d | ... |
| COLOR SIGNAL (CMY) | ... | Da | | Db | Dc | Dd | ... |

| | | | VERTEX COLOR x | | | | |
|---|---|---|---|---|---|---|---|
| SIMULATED COLOR | ... | a | | b | c | d | ... |
| COLOR SIGNAL (CMY) | ... | Da | Da | Db | Dc | Dd | ... |

SMALLEST COLOR DIFFERENCE

METHOD OF DETERMINING COLOR SIGNALS FOR INPUT SIGNALS AT VERTICES IN INPUT COLOR SPACE

BACKGROUND OF THE INVENTION

The present invention generally relates to a color signal determining method, and more particularly to a method of determining color signals for input signals at vertices in an input color space for use in a color transforming unit wherein the determined color signals are read to convert arbitrary input signals within the input color space into color signals. The color signals output from the color transforming unit are used to control the quantities of inks in an image reproducing system.

A color correction circuit converts input color separated signals into color corrected signals CMY, that is, cyan (C), magenta (M) and yellow (Y). The color corrected signals CMY from the color correction circuit are output to control the quantities of inks in an image reproducing system such as a printer. Various color correction methods including linear and non-linear masking methods have been proposed. A linear masking method which corrects a linear distortion can be easily realized with hardware, but it is difficult to achieve highly accurate color correction. A non-linear masking method which corrects a non-linear distortion can achieve highly accurate color correction, but it is difficult to realize the non-linear masking method with hardware because many multipliers are required.

FIG. 1 shows a conventional color correction method. To determine color signals CMY corresponding to arbitrary input signals within an input color space XYZ, the input color space XYZ is divided into a plurality of unit solid figures such as cubes or triangular prisms. For example, in the upper half of FIG. 1, the input color space XYZ is divided into 64 unit cubes, each of which have 8 vertices. In this conventional color correction method, predetermined values of color signals for input signals at vertices of each unit cube in the input color space are read to convert arbitrary input signals in the input color space into color signals through an interpolation. Generally, arbitrary input signals lie at intermediates positions between the vertices in the input color space. Thus, the color signals corresponding to arbitrary input signals are calculated through the interpolation using the predetermined values of the color signals corresponding to the input signals at the vertices in the input color space.

Two kinds of color signal determining methods to determine the color signals for the input signals at all the vertices in the input color space have been proposed.

The first method of the two kinds mentioned above is to determine the color signals for the input signals at the vertices in the input color space by obtaining coefficients of linear masking functions (or non-linear masking functions) in which the variables are defined by the color signals. The coefficients of the linear masking functions are obtained through a least square method by applying a set of given input and output data to the linear masking functions. The color signals for the input signals at the vertices can be calculated in accordance with the linear masking functions using the resulting coefficients, and the calculated color signals are set to the vertices in the input color space.

However, in the first method mentioned above, the coefficients of the linear masking functions with respect to each of the unit cubes are obtained. As shown in the lower half of FIG. 1, the first method has a problem in that color signals obtained based on the coefficients relating to one cube and color signals obtained based on the coefficients relating to another cube adjacent to the former cube are discontinuous at boundaries "b", "c" and "d" between adjacent unit cubes. Therefore, it is difficult to determine accurate color signals for input signals at the boundaries of the cubes in the input color space.

In addition, in the case of the first method described above, it is difficult to determine accurate color signals when the input signals at vertices are outside a color reproduction range of a printer in the input color space. The errors in the reproduced colors for such input signals are large, and the color reproduction accuracy becomes worse.

The second method takes into account masking functions in which the variables are defined by the color signals for the input signals at all the vertices in the input color space. By applying a set of given input and output data to the masking functions, the variables are determined by varying the values of the color signals at all the vertices so as to make the color reproduction error of the color transforming results smallest. The determined color signals are set to the corresponding vertices in the input color space.

The second method mentioned above is effective only when the division number for the input color space is relatively small, or there is a small number of unit solid figures with a small number of vertices. However, when highly accurate color correction is needed and the input color space is divided into a large number of unit solid figures with a large number of vertices, a much greater amount of the calculation is required to determine the color signals for the input signals at all the vertices in the input color space. The processing time by the second method considerably increases when accurate color correction is needed.

In addition, in the cases of the first and second methods described above, it is difficult to determine accurate color signals by using a number of color samples with predetermined quantities of inks. If the distribution of the input and output data of the color samples over the color space deviates, the calculated color signals for input signals at vertices where the related color samples are not available may be extremely large values or the calculations of such color signals may be divergent.

SUMMARY OF THE INVENTION

Accordingly, it is a general object of the present invention to provide an improved color signal determining method in which the above mentioned problem is eliminated.

Another, more specific object of the present invention is to provide a color signal determining method in which accurate color signals for the input signals at all the vertices are efficiently determined when the input color space is divided into a large number of unit solid figures with a large number of vertices.

Still another object of the present invention is to provide a color signal determining method which allows an accurate and efficient color transformation for input signals at a boundary of a color reproduction range of a printer even when the color reproduction range within the input color space is distorted and a division number of the input color space is small.

A further object of the present invention is to provide a color signal determining method which can determine accurate color signals for the input signals at all the vertices by using a finite number of color samples with predetermined quantities of inks even when the distribution of the input and output data of the color samples over the color space deviates.

The above mentioned object of the present invention is achieved by a color signal determining method which comprises steps of: dividing a three-dimensional input color space into a plurality of unit solid figures, each of the solid figures having a set of vertices; calculating a plurality of color correction parameters based on input signals at all the vertices; producing a simulator which correlates predetermined color signals with simulated input signals through the color correction parameters; and determining each of first color signals for the input signals at all the vertices by selecting one of the predetermined color signals as one of the first color signals when a color difference between a color correction parameter relating to one of the input signals at the vertices and a color correction parameter relating to one of the simulated input signals is detected to be smallest among color differences between the above one of the input signals and all the simulated input signals.

The above mentioned object of the present invention is achieved by a color signal determining method which comprises steps of: dividing a three-dimensional input color space into a plurality of unit solid figures, each of the solid figures having a set of vertices; calculating a plurality of color correction parameters based on input signals at all the vertices; producing a simulator which correlates predetermined color signals with simulated input signals through the color correction parameters; detecting whether input signals at the vertices in the input color space are inside a gamut of the image reproducing system or outside the gamut; and determining each of first color signals for the input signals at all the vertices by performing different color signal determining procedures for the input signals at the vertices that are detected to be inside the gamut and for the input signals at the vertices that are detected to be outside the gamut.

According to the present invention, it is possible to efficiently determine accurate color signals for input signals at vertices in an input color space when the input color space is divided into a large number of unit solid figures with a large number of vertices, allowing a color correction accuracy higher than that of a conventional color correction method. In addition, it is possible to provide an accurate and efficient color transformation for input signals at the boundary of the gamut of the printer even when the gamut in the input color space is distorted and the division number of the input color space is relatively small. Further, it is possible to determine accurate color signals for input signals with respect to the whole input color space even when the distribution of the input and output data of the color samples, with the predetermined quantities of the inks over the color space, deviates.

BRIEF DESCRIPTION OF THE DRAWINGS

The above and other objects, features and advantages of the present invention will be more apparent from the following detailed description when read in conjunction with the accompanying drawings in which.

DESCRIPTION OF THE PREFERRED EMBODIMENTS

A description will now be given of a color transforming method to which the present invention is applied, with reference to FIGS. 2 and 3.

Figure 1:
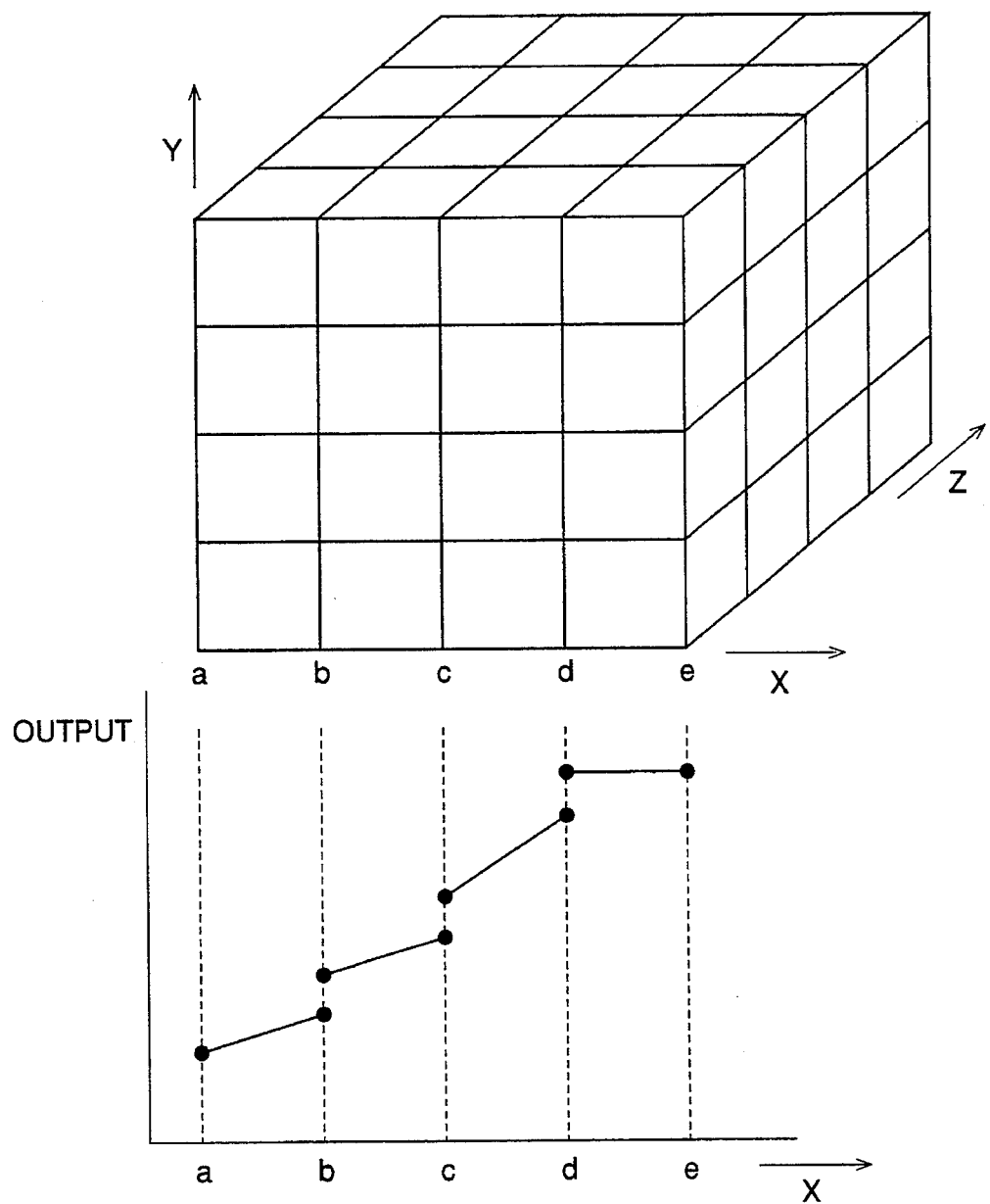
FIG. 1 is a diagram for explaining a conventional color correction method.
Figure 2:
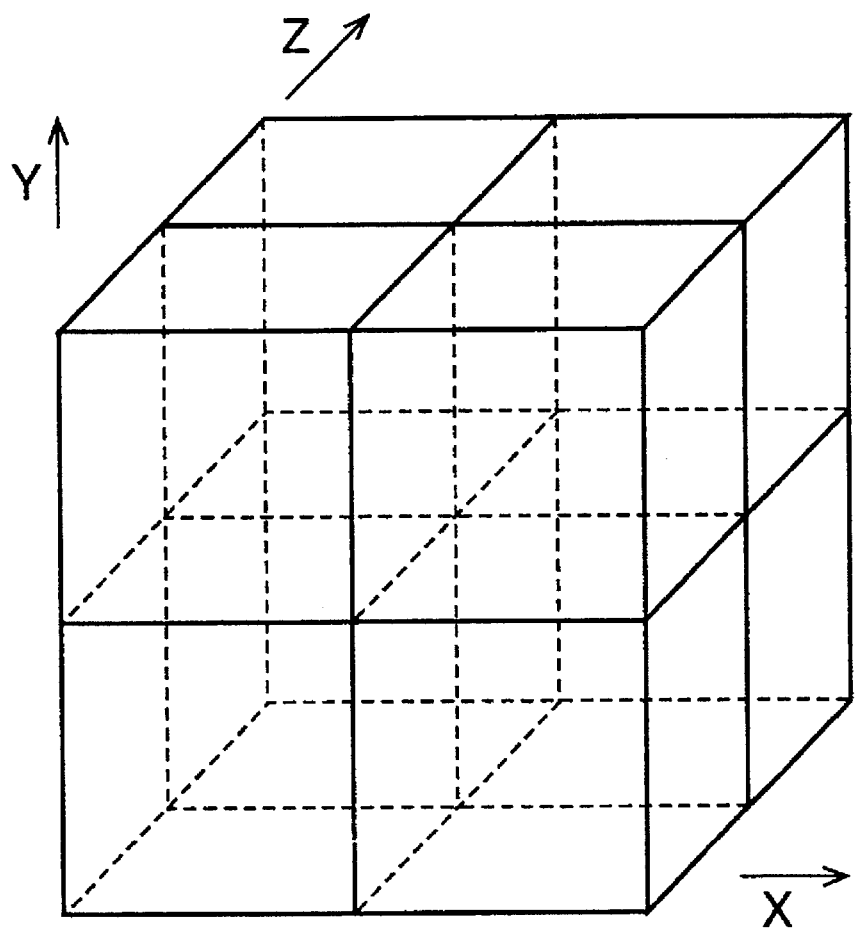
FIG. 2 is a diagram showing an input color space which is divided into unit cubes each having a set of vertices.

FIG. 2 shows an input color space which is divided into a plurality of unit cubes. In FIG. 1, each unit cube in the input color space has eight vertices which represent input signals for which color signals are determined for use in a color transforming unit. The color transforming unit converts arbitrary input signals XYZ within the input color space into color signals P through an interpolation using the predetermined color signals for the input signals at the vertices in the input color space. The color signals P are output by the color transforming unit to control the quantities of inks in an image reproducing system such as a color printer.

To determine the color signals P from the input signals XYZ by the color transforming unit, one of the cubes in the input color space in FIG. 1 which encompasses the input signals XYZ is selected. The color signals P are calculated through an interpolation using the predetermined color signals for the input signals at the vertices of the selected cube through the interpolation.

The input signals XYZ mentioned above are, for example, color separated signals X, Y and Z in CIE 1931 standard colorimetric system, and the color signals P mentioned above are, for example, color corrected signals, that is, yellow (Y), magenta (M) and cyan (C) signals used to control the quantities of the inks in a printer.

Figure 3:
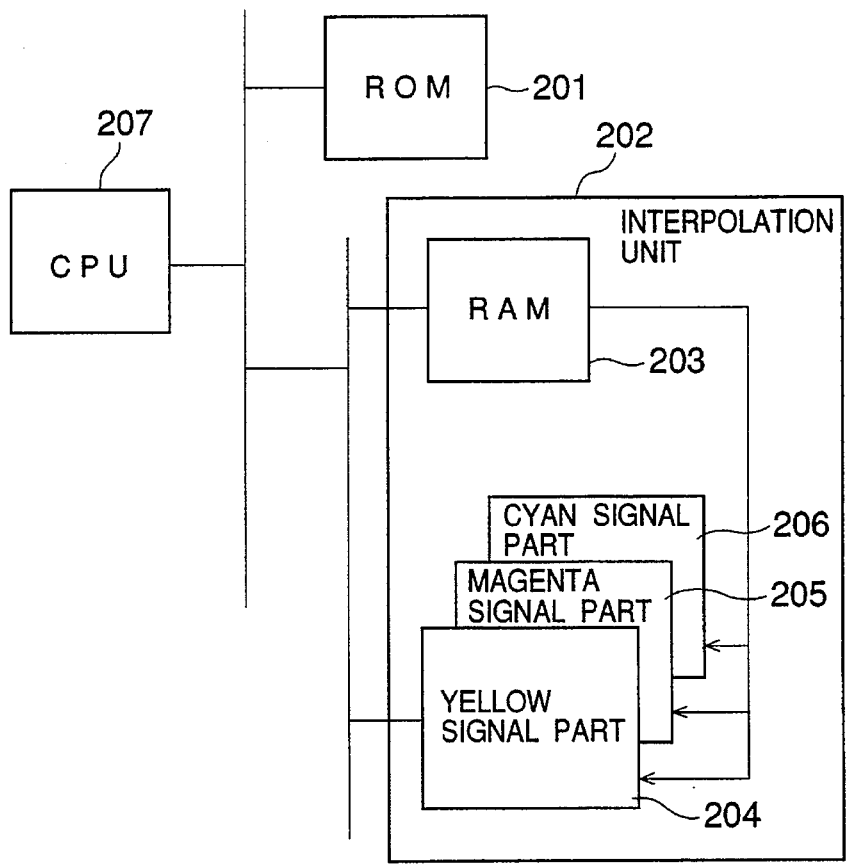
FIG. 3 is a system block diagram showing a color transforming unit to which the present invention is applied.

FIG. 3 shows a color transforming unit to which the present invention is applied. In FIG. 3, the color transforming unit comprises a ROM (read only memory) 201, an interpolation unit 202, and a CPU (central processing unit) 207. In the ROM 201, a color transforming table, which defines the color corrected signals corresponding to the input signals at all the vertices in the input color space, is stored. The interpolation unit 202 comprises a RAM (random access memory) 203, a yellow signal part 204, a magenta signal part 205, and a cyan signal part 206.

When arbitrary input signals are input to the color transforming unit, the color transforming unit carries out a color transforming process to output color signals for the input signals. The predetermined color corrected signals which correspond to the input signals at the vertices of one selected cube encompassing the supplied input signals are read out from the ROM 201 and loaded into the RAM 203. The yellow, magenta and cyan signal parts 204, 205 and 206 respectively convert the supplied input signals into color corrected signals through an interpolation using the predetermined color corrected signals in the RAM 203, and output the color corrected signals Y, M and C signals to control the quantities of the inks in an image reproducing system. The CPU 207 controls the operation of each of the components of the color transforming unit described above.

Next, a description will be given of a color signal determining process in the first embodiment of the present invention, with reference to FIGS. 4 through 7B.

Figure 4:
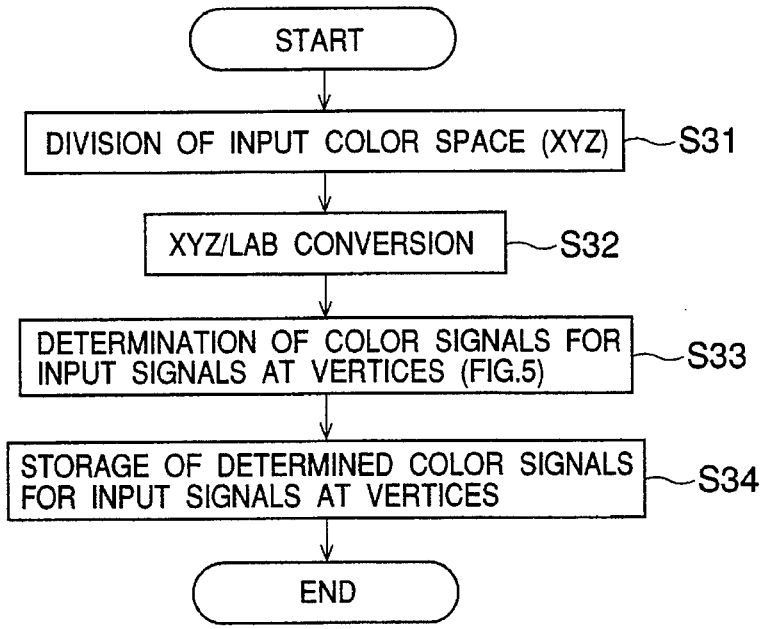
FIG. 4 is a flow chart for explaining a color signal determining process in a first embodiment of the present invention.

FIG. 4 shows the color signal determining process in the first embodiment. In this process, color signals for the input signals at the vertices within the input color space are determined.

In FIG. 4, step S31 sets a division range of each of the three orthogonal axes of an input color space XYZ, sets the number of divisions for each of the three orthogonal axes, and divides each axis of the input color space into $2^n$ segments to create ($2^n$+1) representative vertices in the input color space.

Step S32 calculates an XYZ/LAB conversion which determines color correction parameters L*a*b* for the input signals XYZ at all the representative vertices in the input color space. This calculation is defined by the following equations.

$$L^*=116(Y/Yo)^{1/3}-16$$

$$a^*=500((X/Xo)^{1/3}-(Y/Yo)^{1/3})$$

$$b^*=200((Y/Yo)^{1/3}-(Z/Zo)^{1/3}) \quad (1)$$

where Xo, Yo and Zo are given values of input signals for a white point in a case of a standard illumination.

Step S33 provides a LAB/CMY conversion which determines color signals CMY for the respective color correction parameters L*a*b* calculated based on the input signals at all the vertices. The color signals CMY are to control the quantities of the inks in the image reproducing system. The LAB/CMY conversion mentioned above is achieved by using a printer simulator which will be described below.

Figure 5:
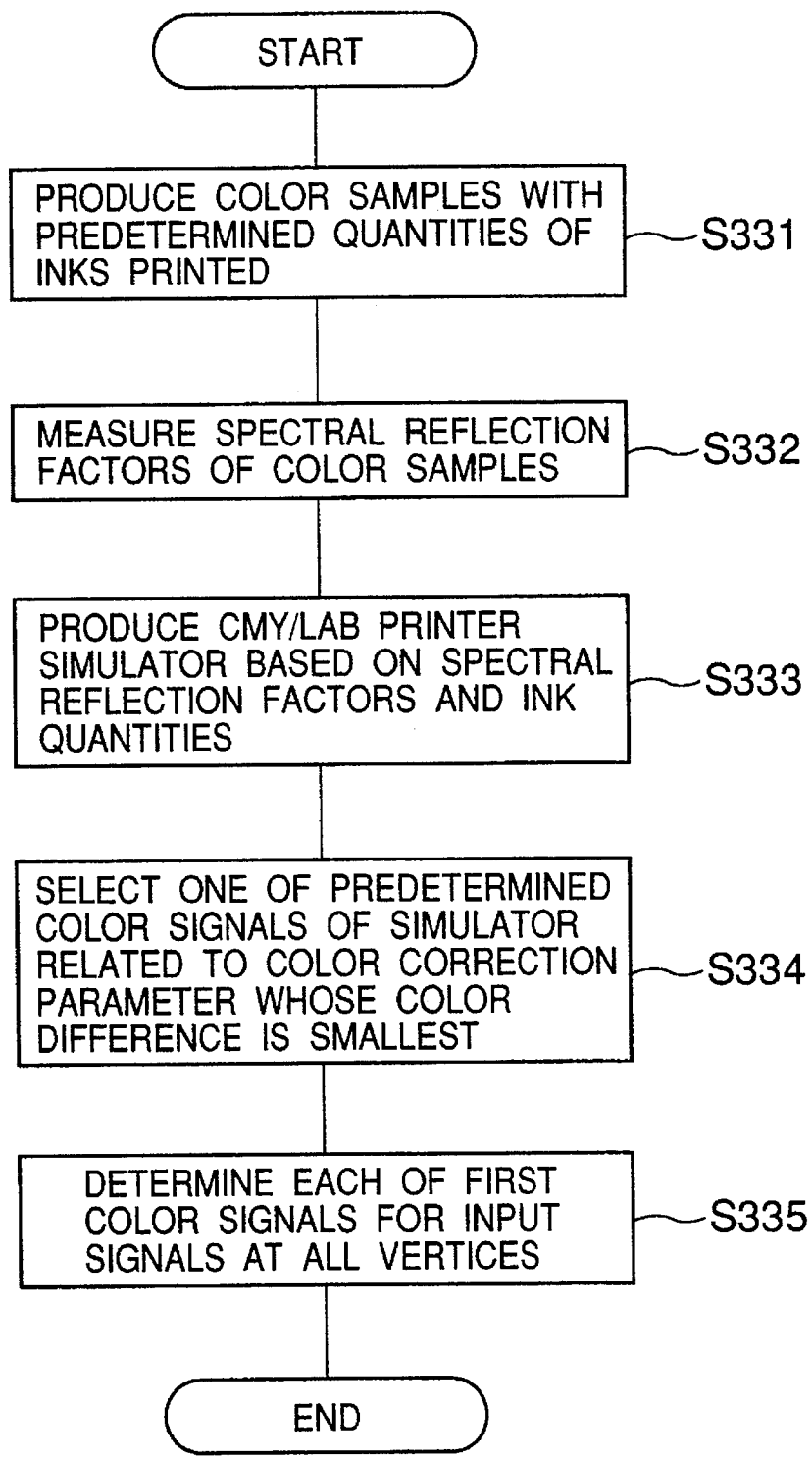
FIG. 5 is a flow chart for explaining a step of the color signal determining process in FIG. 4.

FIG. 5 shows the step S33 in the color signal determining process in more detail. In FIG. 5, step S331 produces a plurality of color samples which are printed with predetermined quantities of inks for each of cyan, magenta and yellow. The quantity of ink for each of yellow, magenta and cyan with respect to the color samples is defined by a digital value (0 to 255) of one of 256 color signals for each of cyan, magenta and yellow.

Step S332 measures spectral reflection factors of each of the color samples using a colorimeter. The measurements of the spectral reflection factors of the color samples by the colorimeter produce a plurality of simulated input signals.

Step S333 produces a CMY/L*a*b* printer simulator based on the measured spectral reflection factors and the ink quantities. This simulator correlates predetermined color signals with the simulated input signals through the color correction parameters. Each of the simulated input signals are obtained from the measurements of the spectral reflection factors of the color samples. Each of the predetermined color signals CMY are obtained from the predetermined quantities of the inks printed on the color samples. For example, the ink quantities for $256^3$ colors for each of cyan, magenta and yellow including possible combinations of the colors are modeled, and the color signals CMY are converted into the color correction parameters in the L*a*b* space based on the spectral distribution of the measured spectral reflection factors and the spectral distribution of the light source of the colorimeter.

Step S334 selects one of the predetermined color signals of the simulator as one of the first color signals for the input signals at all the vertices when a color difference ▲E between a color correction parameter Liaibi relating to one of the input signals at the vertices and a color correction parameter Loaobo relating to one of the simulated input signals of the simulator is detected to be smallest among all the color differences between the above one of the input signals at the vertices and all the simulated input signals of the simulator. The color difference ▲E mentioned above is defined by the following equation.

$$\blacktriangle E=[(Li-Lo)^2+(ai-ao)^2+(bi-bo)^2]^{1/2} \quad (2)$$

Step S335 determines each of the first color signals CMY for the input signals at all the vertices in the input color space XYZ by selecting one of the predetermined color signals as in the above step S334.

Referring to FIG. 4, step S34 stores a color transforming table which defines the first color signals CMY for the input signals at all the vertices in the input color space XYZ after the first color signals CMY for the input signals at all the vertices in the input color space are determined. A file of the color transforming table is stored in the ROM 201 of the color transforming unit in FIG. 2 for use in the image reproducing system.

Figures 6, 7A, 7B:
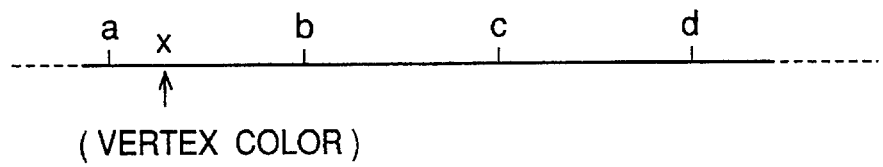
FIG. 6 is a diagram showing a color obtained from one of the input signals at the vertices and colors obtained from measured spectral reflection factors of color samples.
FIGS. 7A and 7B are diagrams for explaining a relationship between the colors of the measured spectral reflection factors and the colors of the color signals CMY.

FIG. 6 shows a vertex color "x" obtained from one of the input signals at the vertices and a set of simulated colors "a" through "d" obtained from measurements of the spectral reflection factors of the color samples. The colors "a" through "d" and the color "x" are actually values of the color correction parameters L*a*b* expressed in the L*a*b* space.

FIGS. 7A and 7B show a relationship between the simulated colors of the measured spectral reflection factors and the color signals CMY. The simulator at the above step S333 can provide predetermined color signals "Da", "Db", "Dc" and "Dd" for the simulated input signals "a", "b", "c" and "d" respectively. However, a color signal CMY for the vertex color "x" that is one of the input signals at the vertices in the input color space is unknown at the step S333, as in FIG. 7A. In the first embodiment described above, the predetermined color signal "Da" is selected as the color signal CMY for the vertex color "x" by detecting that the color difference ▲E between a color correction parameter L*a*b* relating to the vertex color "x" and a color correction parameter L*a*b* relating to the simulated input signals "a" is smallest among all the color differences between the vertex color "x" and all the simulated input signals "a" through "d", as shown in FIG. 7B. In this manner, the first embodiment determines the color signals for the input signals all at the vertices in the input color space.

Next, a description will be given of a color signal determining process in the second embodiment of the present invention, with reference to FIGS. 8 through 14.

Figure 8:
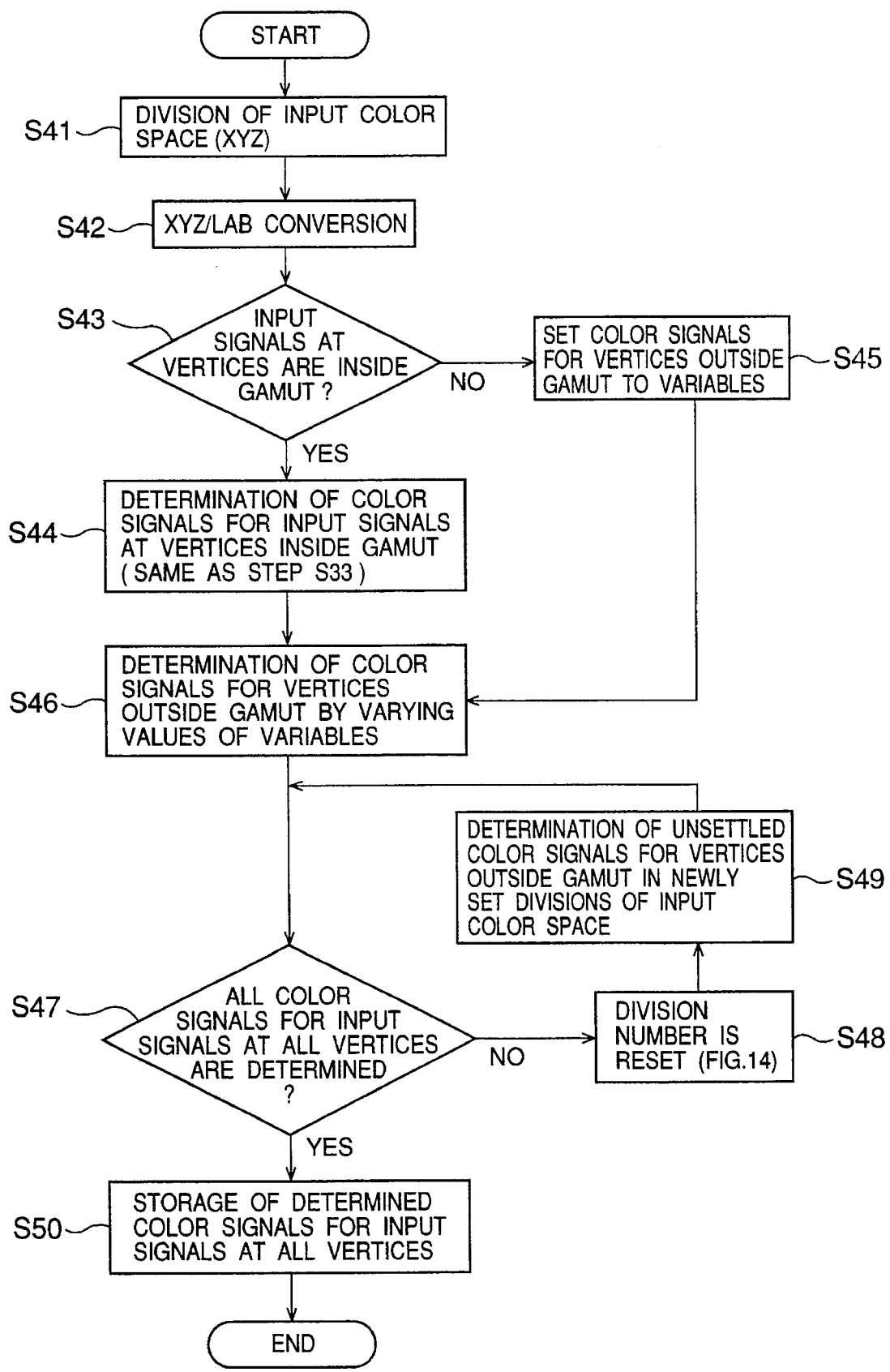
FIG. 8 is a flow chart for explaining a color signal determining process in a second embodiment of the present invention.

FIG. 8 shows a color signal determining process in the second embodiment. In FIG. 8, step 41 sets a division range of each of the three orthogonal axes of the input color space XYZ, sets the number of divisions on each of the three orthogonal axes, and divides each axis of the input color space into $2^n$ segments to create $(2^n+1)$ representative vertices in the input color space.

Step S42 calculates an XYZ/LAB conversion which determines color correction parameters L*a*b* for the input signals XYZ at all the vertices in the input color space. This calculation is defined by the above equations (1).

As described above, the input color space is a standard color space which is device-independent. However, a color reproduction range in which the image reproducing system such as a printer can reproduce colors with a high accuracy is restricted in the input color space, and the color reproduction range in the input color space is highly dependent on the image reproduction system. The color reproduction range in the input color space mentioned above is referred to as the gamut in the literature, and hereinafter, the color reproduction range will be called the gamut.

Step S43 detects whether an input signal at a vertex among all the vertices in the input color space is inside the gamut of the image reproducing system or outside the gamut. For use in the determination of whether the input signal at the first vertex is inside or outside the gamut, the L*a*b* space is quantized with respect to each of luminance, hue and saturation, and the printer simulator described above is used to obtain color correction parameters relating to input signals on the boundary of the gamut in each of the quantized color spaces.

Figure 9:
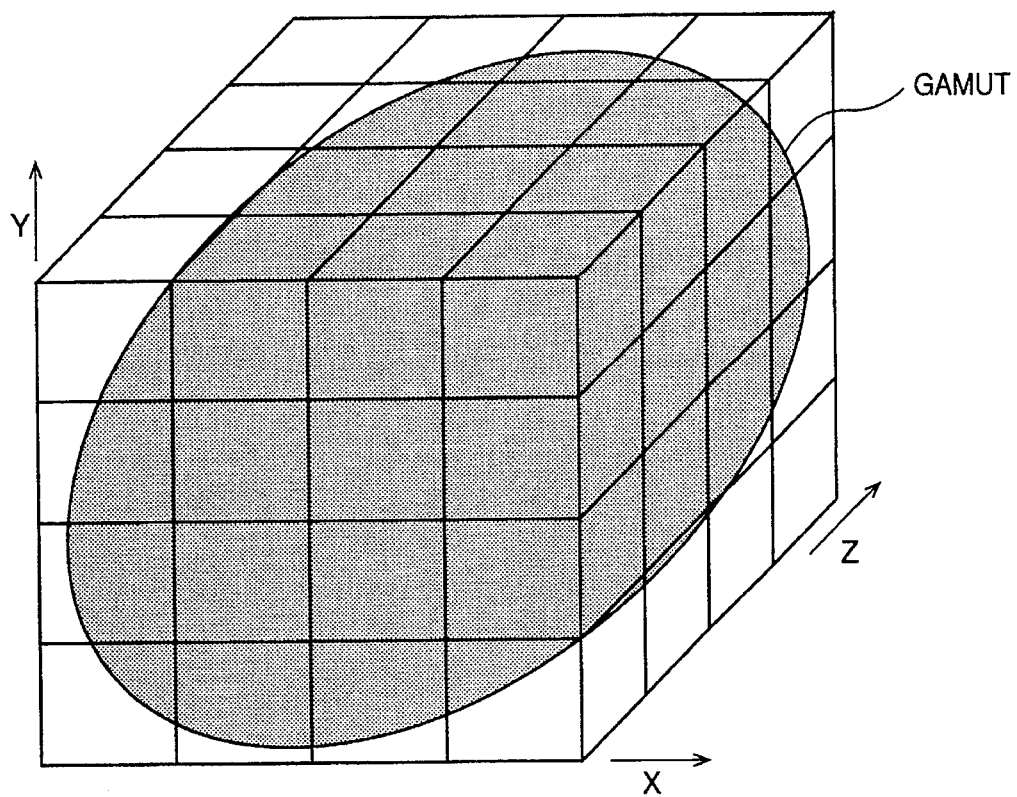
FIGS. 9 and 10 are diagrams for explaining a relationship between an input color space and a color reproduction range (or gamut) of an image reproducing system (or printer)
Figure 10:
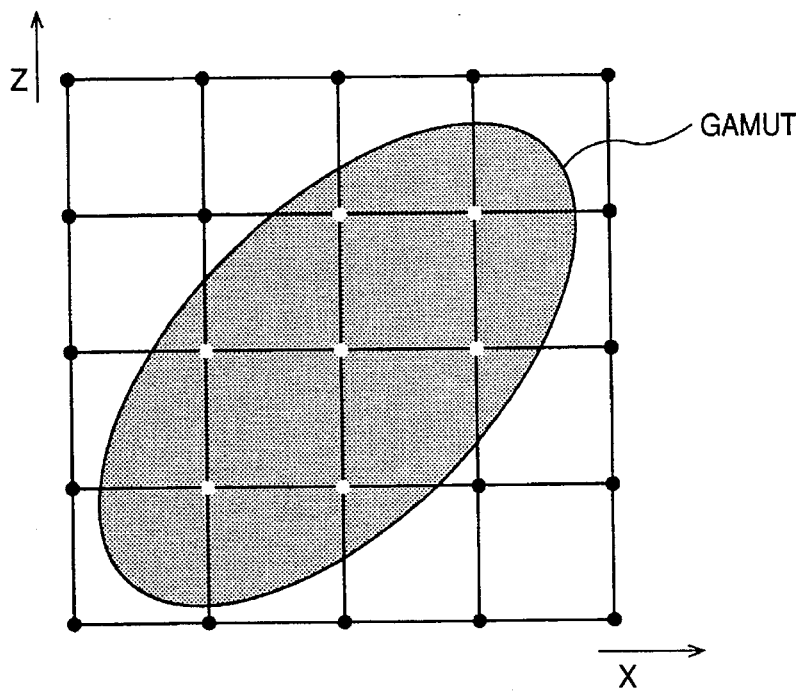

FIG. 9 shows a relationship between an input color space and a gamut of an image reproducing system such as a printer. As shown, input signals within the input color space do not necessarily lie inside the gamut, and some of the input signals are outside the gamut. FIG. 10 shows an XZ section of the input color space in FIG. 9. In FIG. 10, input signals at vertices in the input color space which are located inside the gamut are indicated by white dots, and input signals at vertices in the input color space which are located outside the gamut are indicated by black dots.

Figure 11:
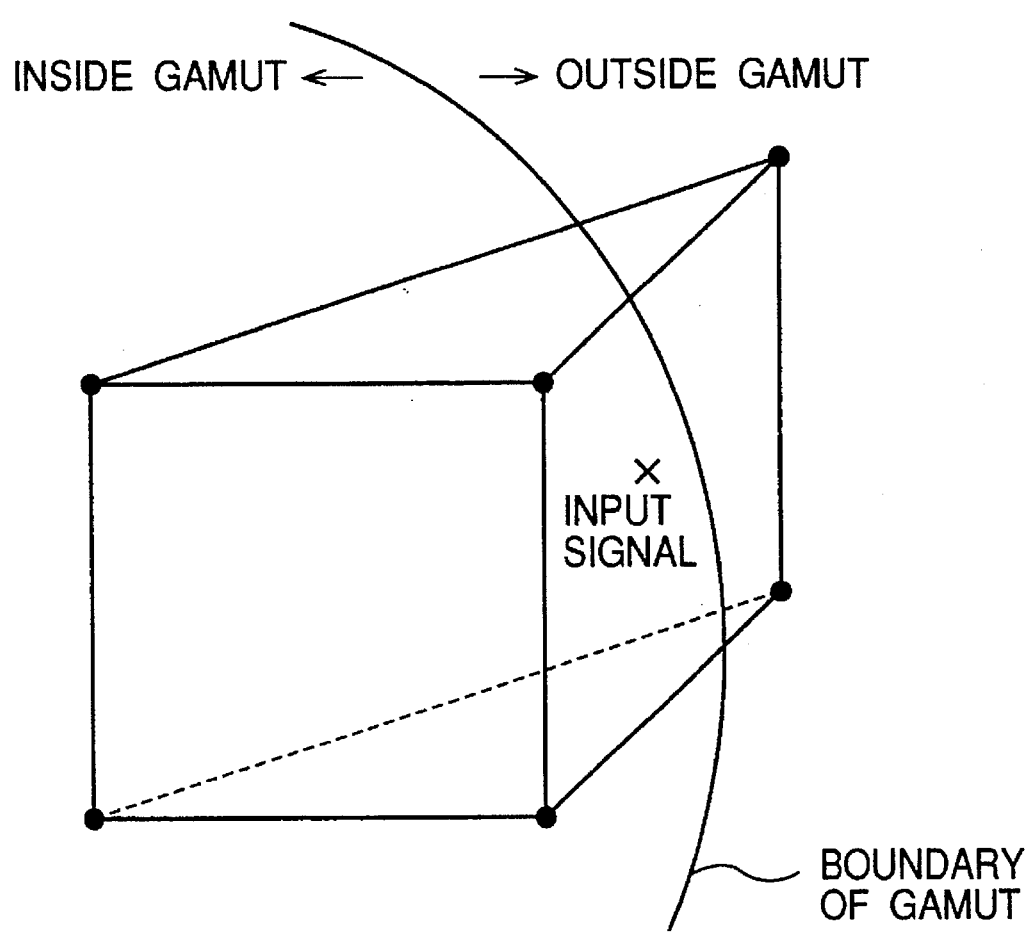
FIG. 11 is a diagram for explaining a color signal determination using a triangular prism interpolation.
Figure 12:
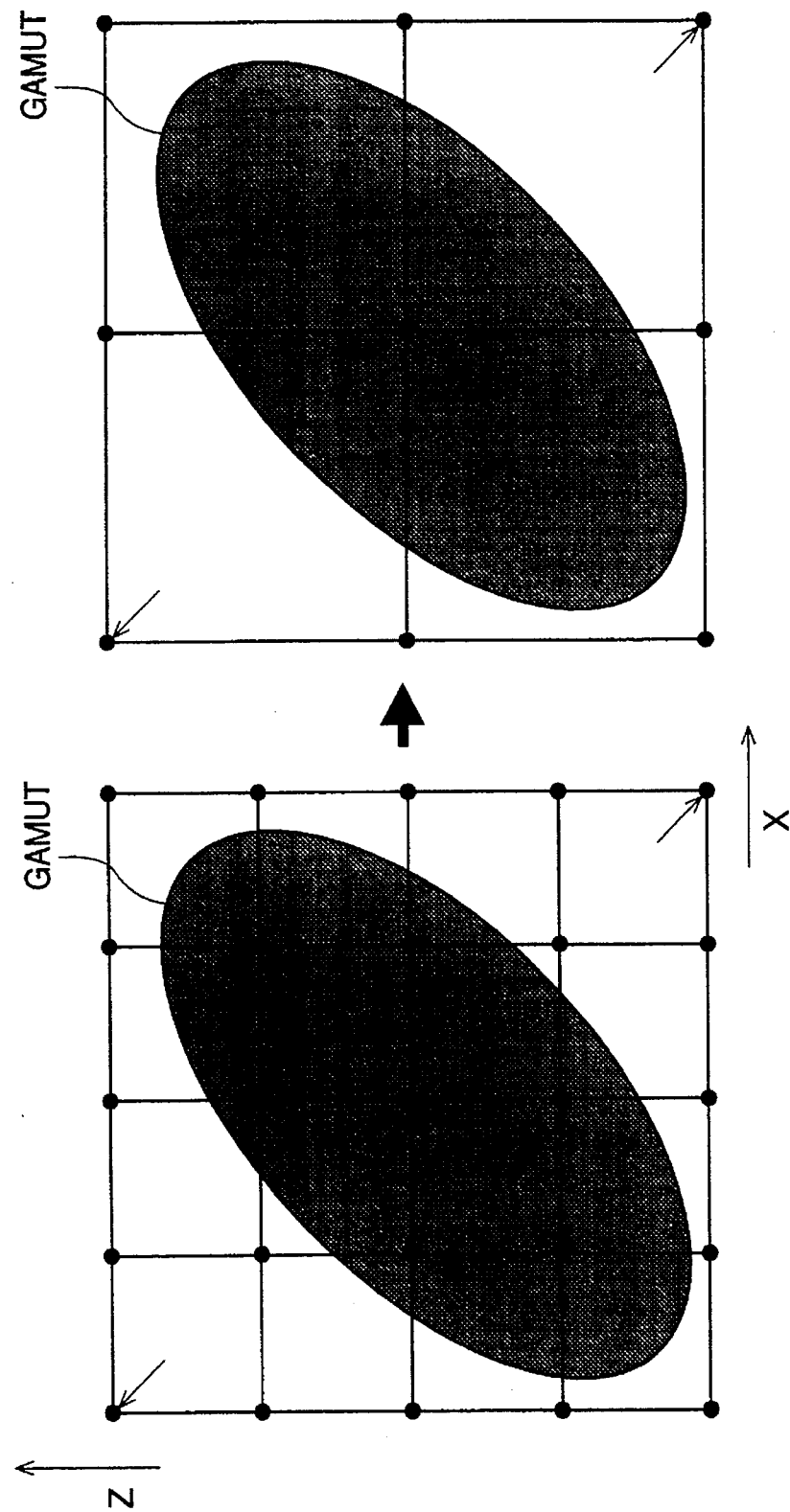
FIGS. 12A and 12B are diagrams for explaining a step of the color signal determining process in FIG. 8 to reset a division number of the input color space.

FIG. 11 shows a color signal determination using a triangular prism interpolation. This is another method of color signal determination. Unlike the color signal determining process using the cube interpolation described above, in this color signal determining method, the input color space is divided into a plurality of unit triangular prisms each having six vertices. Color signals for arbitrary input signals in the input color space are determined through a triangular prism interpolation by using predetermined color signals for the input signals at all the vertices. Also, in FIG. 11, input signals at the vertices in the input color space do not necessarily lie inside the gamut, and some of the input signals are outside the gamut.

Referring to FIG. 8, step S44 is performed for the input signals at the vertices which are detected to be inside the gamut (the result at step S43 is affirmative), and step S45 is performed for the input signals at the vertices which are detected to be outside the gamut (the result at step S43 is negative).

Step S44 determines color signals CMY for the color correction parameters L*a*b* in step S42 relating to the input signals at the vertices that are detected to be inside the gamut. The color signals CMY are output to control the quantities of the inks in the image reproducing system. The LAB/CMY conversion provided by the step S44 is carried out by using the above printer simulator, similarly to the step S33 in the first embodiment described above.

Step S45 sets color signals CMY for the color correction parameters L*a*b* in step S42 relating to the input signals at the vertices that are detected to be outside the gamut, to variables.

Step S46 determines a set of "n" color signals for "n" given input signals inside the gamut through the interpolation by using the determined color signals CMY for the input signals at the vertices inside the gamut in step S44. By using the given color signals for the given input signals, step S46 determines the variables in step S45 by varying values of the variables so as to make color differences between color correction parameters relating to the input signals at the vertices that are detected to be inside the gamut and color correction parameters relating to the simulated input signals from the simulator smallest. In step S46, the values of the color signals for the input signals at the vertices that are detected to be outside the gamut are varied so as to make the color differences smallest, and the color signals for the input signals at the vertices outside the gamut are thus determined.

Figure 13:
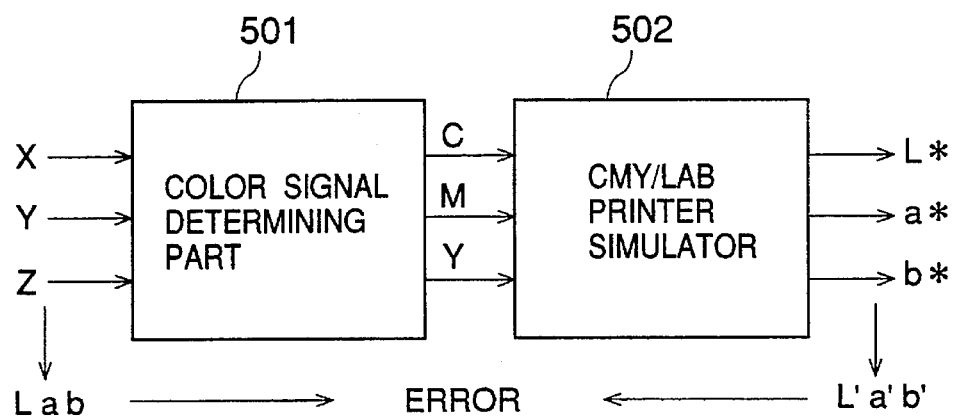
FIG. 13 is a diagram for explaining a step of the color signal determining process in FIG. 8 to determine color signals for input signals at vertices outside the gamut.

FIG. 13 shows this step S46 to determine color signals for input signals at vertices outside the gamut. In FIG. 13, there are shown a color signal determining part 501 and a CMY/LAB printer simulator 502 which carry out the determination of the color signals at the vertices outside the gamut. The color signal determining part 501 is the same as the above color signal transforming unit in the first embodiment, and it can provide "n" pieces of color signal data CMY for the input signals inside the gamut, which are determined through interpolation by reading out the stored color signals CMY for the input signals at the vertices inside the gamut. The CMY/LAB printer simulator 502 is the same the above CMY/LAB printer simulator in the first embodiment, and it can provide the color correction parameters L*a*b* for the color signal data CMY from the part 501. Thus, the variables of the color signals at the incomplete vertices are determined by finding values of the variables that satisfy the condition that color differences between color correction parameters relating to the input signals at the vertices inside the gamut and color correction parameters relating to the simulated input signals are smallest for the "n" pieces of the given color signals for the given input signals.

After step S46 is performed, step S47 detects whether or not the determination of all the color signals for the input signals at all the vertices is settled. If samples of input signals within some unit cubes in the input color space are not given, color signals for the input signals at the vertices of such unit cubes cannot be determined. In such a case, the determination of the color signals for the input signals at some of the vertices is unsettled.

When the result at step S47 is negative, step 48 resets the number of divisions of the input color space to a new division number so that the unit cubes include the given input and output data as well as the vertices whose color signals are undetermined.

FIG. 12A shows an XZ section of the input color space in which color signals for input signals at certain vertices within the unit cubes are undetermined because input signals within the unit cubes and color signals for the input signals are not given. FIG. 12B shows the XZ section in which the unit cubes are enlarged after the division number is reset to include the given input and output data as well as the vertices whose color signals are undetermined.

Figure 14:
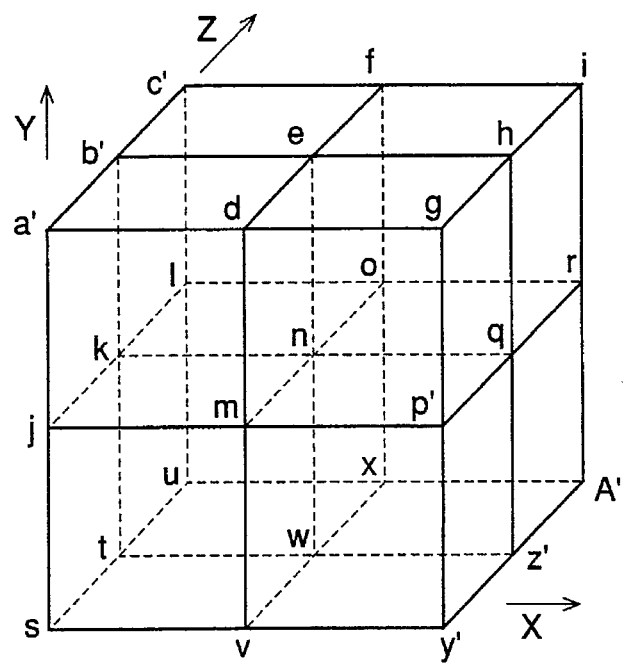
FIG. 14 is a diagram for explaining a step of the color signal determining process in FIG. 8 to determine color signals for input signals at vertices where the determination of color signals is incomplete.

FIG. 14 shows an example of the above step S48 to determine color signals for input signals at vertices where the determination of color signals is incomplete. In FIG. 14, it is assumed that vertices a', b', c', p', y', z' and A' are detected to be outside the gamut, and that the color signals for input signals at the other vertices which are detected to be inside the gamut have been determined at step S44. When the color signals for the input signals at the vertices outside the gamut are determined at step S46, a color signal for an input signal at the vertex a' cannot be determined if no samples of input signals within the cube "abed-jknm" are given. In such a case, the original division number of the input color space is reset to a new division number at step S48, such that the enlarged cube "acig-suAy" which is a newly set unit cube includes given input and output data as well as the vertex a' whose color signal is unsettled.

After step S48 is performed, step S49 determines the unsettled variables by varying values of the variables so as to make the color differences between color correction parameters relating to the input signals at the vertices inside the gamut and color correction parameters relating to the simulated input signals from the simulator smallest by incorporating the given input signals into newly set unit cubes and using the given color signals for the given input signals.

If the result at step S47 is affirmative, step S50 stores a color transforming table which defines the first color signals CMY for the input signals at all the vertices in the input color space XYZ after all the first color signals are determined in step S47. A file of the color transforming table is stored in the ROM 201 of the color transforming unit in FIG. 2 for use in the image reproducing system.

In the embodiment described above, it is possible to efficiently determine accurate color signals for input signals at vertices in an input color space when the input color space is divided into a large number of unit solid figures with a large number of vertices, allowing a color correction accuracy higher than that of a conventional color correction method. Performing a large amount of calculations to determine the color signals for input signals at vertices as in the conventional color correction method is no longer necessary, and the processing time to determine the color signals can be remarkably reduced.

In addition, in the embodiment described above, it is possible to provide an accurate and efficient color transformation for input signals at the boundary of the gamut of the printer even when the gamut in the input color space is distorted and the division number of the input color space is relatively small. The processing time to determine the color signals can be reduced, and the color reproduction errors for input signals at the boundary of the gamut is minimized.

In addition, in the embodiment described above, it is possible to determine accurate color signals for input signals with respect to the whole input color space even when the distribution of the input and output data of the color samples with the predetermined quantities of the inks over the color space deviates.

Further, the present invention is not limited to the above described embodiments, and various variations and modifications may be made without departing from the scope of the present invention.

What is claimed is:

1. A method of determining color signals for input signals at vertices in a three-dimensional input color space for use in a color transforming unit wherein the determined color signals are read to convert arbitrary input signals within the input color space into color signals through an interpolation, the color signals being output to control quantities of inks in an image reproducing system, said method comprising steps of:

dividing a three-dimensional input color space into a plurality of unit solid figures, each of the solid figures having a set of vertices;

calculating a plurality of color correction parameters based on input signals at all the vertices;

producing a simulator which correlates predetermined color signals with simulated input signals through the color correction parameters; and determining each of first color signals for the input signals at all the vertices by selecting one of the predetermined color signals as one of the first color signals when a color difference between a color correction parameter relating to one of the input signals at the vertices and a color correction parameter relating to one of the simulated input signals is detected to be smallest among color differences between said one of the input signals and all the simulated input signals.

2. A method according to claim 1, wherein each of the simulated input signals are obtained from measurements of spectral reflection factors of color samples, and each of the predetermined color signals are obtained from predetermined quantities of inks of the color samples.

3. A method according to claim 1, further comprising a step of storing a color transforming table which defines the first color signals for the input signals at all the vertices.

4. A method of determining color signals for input signals at vertices in a three-dimensional input color space for use in a color transforming unit wherein the determined color signals are read to convert arbitrary input signals within the input color space into color signals through an interpolation, the color signals being output to control quantities of inks in an image reproducing system, said method comprising steps of:

dividing a three-dimensional input color space into a first plurality of unit solid figures, each of the solid figures having a set of vertices;

calculating a plurality of color correction parameters based on input signals at all the vertices;

producing a simulator which correlates predetermined color signals with simulated input signals through the color correction parameters;

detecting whether each of input signals at the vertices in the input color space are inside a gamut of the image reproducing system or outside the gamut; and determining each of first color signals for the input signals at all the vertices by performing different color signal determining procedures for the input signals at the vertices that are detected to be inside the gamut and for the input signals at the vertices that are detected to be outside the gamut.

5. A method according to claim 4, further comprising a step of storing a color transforming table which defines said first color signals for the input signals at all the vertices.

6. A method according to claim 4, wherein each of the simulated input signals are obtained from measurements of spectral reflection factors of color samples, and each of the predetermined color signals are obtained from predetermined quantities of inks of the color samples.

7. A method according to claim 4, further comprising a step of:

determining each of the first color signals for the input signals at the vertices that are detected to be inside the gamut, by selecting one of the predetermined color signals as said each first color signal when a color difference between a color correction parameter relating to one of the input signals at the vertices and a color correction parameter relating to one of the simulated input signals is detected to be smallest among all the color differences between said one of the input signals and the simulated input signals.

8. A method according to claim 4, further comprising steps of:

setting the first color signals for the input signals at the vertices that are detected to be outside the gamut, to variables; and determining the variables by varying values of the variables so as to make color differences between color correction parameters relating to the input signals at the vertices that are detected to be inside the gamut and color correction parameters relating to the simulated input signals from the simulator smallest when a set of given input signals and given color signals for the given input signals are applied.

9. A method according to claim 8, further comprising steps of:

resetting an original division number of the input color space to a new division number when the determination of the variables for the input signals at some of the vertices outside the gamut is unsettled, so that the input color space is divided into a second, smaller plurality of unit solid figures; and determining the unsettled variables by varying values of the variables so as to make color differences between color correction parameters relating to the input signals at the vertices that are detected to be inside the gamut and color correction parameters relating to the simulated input signals from the simulator smallest by incorporating the given input signals into newly set unit solid figures and using the given color signals for the given input signals.

10. A method according to claim 8, wherein each of the simulated input signals are obtained from measurements of spectral reflection factors of color samples, and each of the predetermined color signals are obtained from predetermined quantities of inks of the color samples.

* * * * *